(No Model.)   3 Sheets—Sheet 1.

G. G. ALTMAN.
APPARATUS FOR TEACHING ARITHMETIC, &c.

No. 588,371. Patented Aug. 17, 1897.

WITNESSES
Geo. H. Jaekel.
R. F. Pelouze.

INVENTOR
George G. Altman
BY
Francis Jaeger
ATTORNEYS.

(No Model.) 3 Sheets—Sheet 2.

G. G. ALTMAN.
APPARATUS FOR TEACHING ARITHMETIC, &c.

No. 588,371. Patented Aug. 17, 1897.

WITNESSES:
Geo. W. Jackel
R. F. Pelouze

INVENTOR
George G. Altman
by Isaac ——
ATTORNEYS (No Model.)  3 Sheets—Sheet 3.
G. G. ALTMAN.
APPARATUS FOR TEACHING ARITHMETIC, &c.
No. 588,371. Patented Aug. 17, 1897.
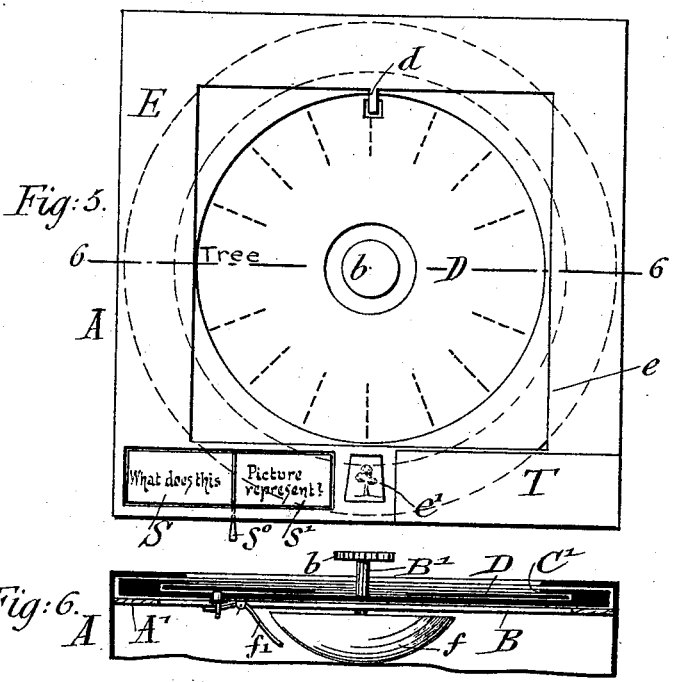
Fig. 5.
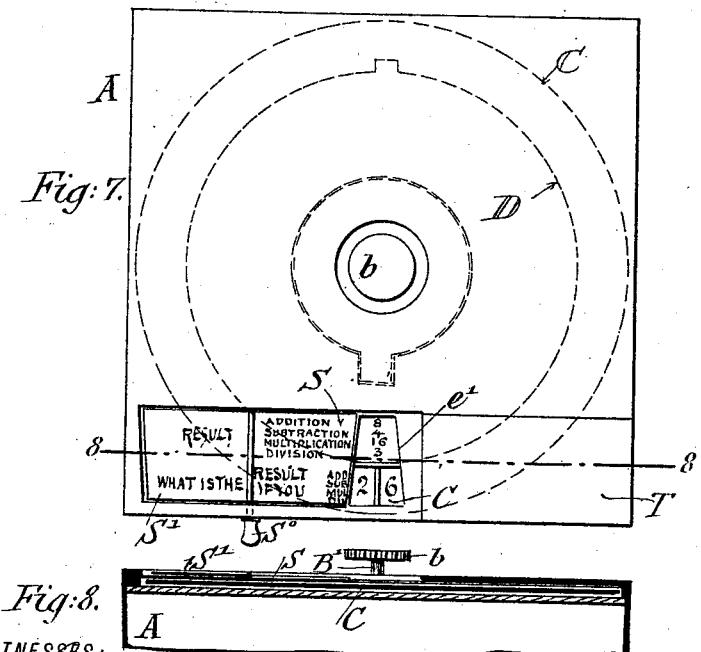
Fig. 7.
Fig. 6.
Fig. 8.
WITNESSES:
Geo. W. Jaeckel
R. F. Pelouze
INVENTOR
George G. Altman
BY
ATTORNEYS.
THE NORRIS PETERS CO., PHOTO-LITHO., WASHINGTON, D. C.

UNITED STATES PATENT OFFICE.

GEORGE G. ALTMAN, OF NEW YORK, N. Y.

APPARATUS FOR TEACHING ARITHMETIC, &c.

SPECIFICATION forming part of Letters Patent No. 588,371, dated August 17, 1897.

Application filed October 6, 1896. Serial No. 608,012. (No model.)

*To all whom it may concern:*

Be it known that I, GEORGE G. ALTMAN, a citizen of the United States, residing in the city, county, and State of New York, have invented certain new and useful Improvements in Apparatus for Teaching Arithmetic, &c., of which the following is a specification.

This invention has reference to an improved apparatus by which children can easily be taught the different branches of arithmetic, as well as the names of objects, by means of pictures, so that they are not only entertained, but are also instructed.

The invention consists of an apparatus for teaching arithmetic, names of or the appearance of objects, &c., which comprises a casing, a rotary disk supported in said casing, an index-sheet adapted to be attached to the disk, a cover provided with openings for exposing the figures or objects, a result-sheet adapted to be fixed to said cover, so that the index-sheet may be moved independently of the result-sheet, and a suitable proving device, which can be properly operated only when the correct result is known.

The invention consists, further, of certain details of construction which are used in connection with the operating parts of the device, as will be fully described hereinafter and finally pointed out in the claims.

Figure 1:
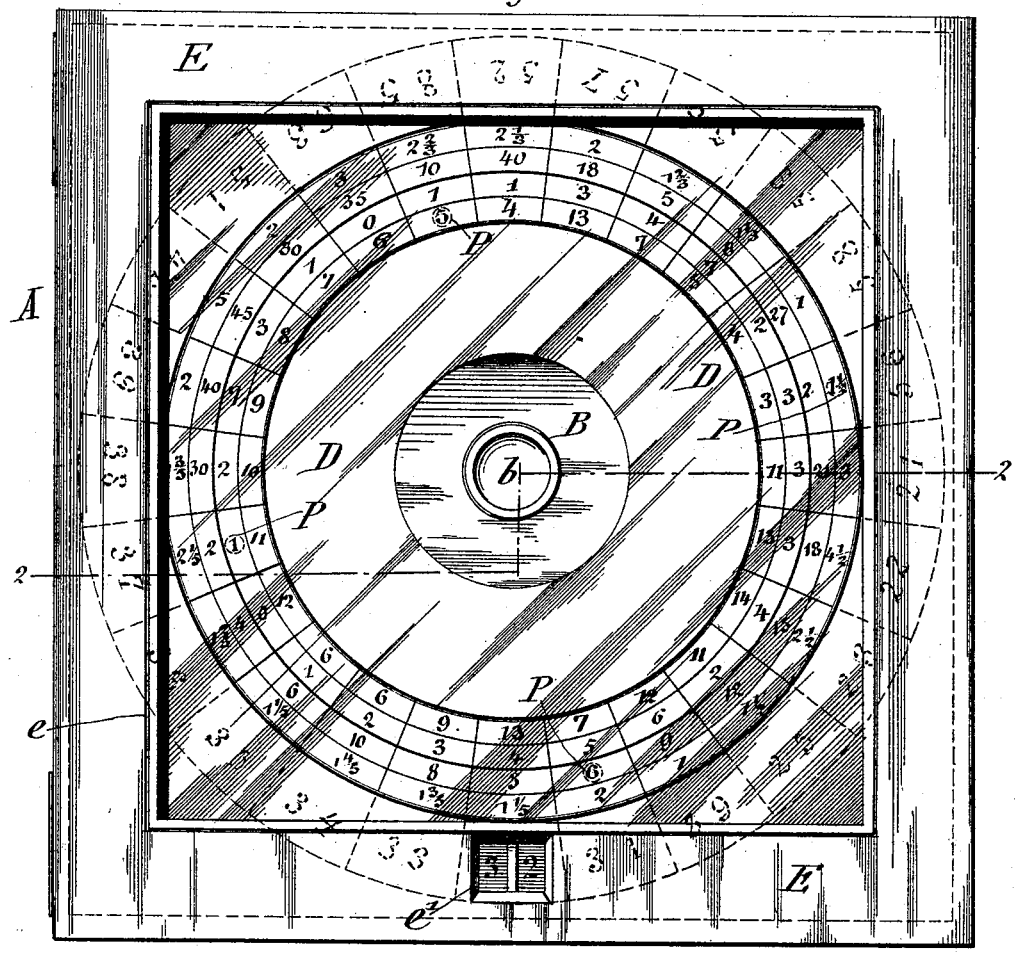
Figure 2:
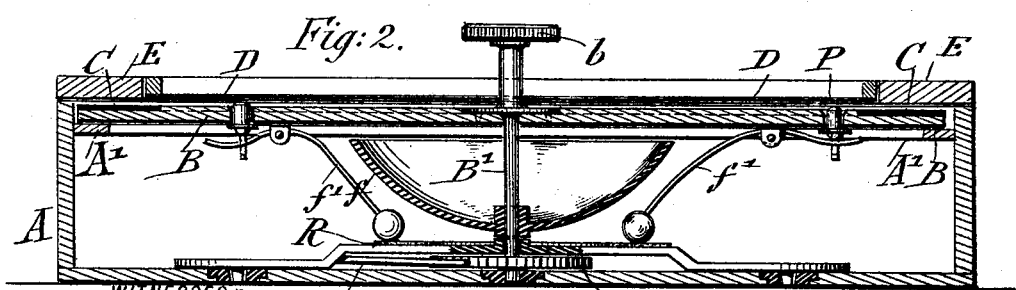
Figure 3:
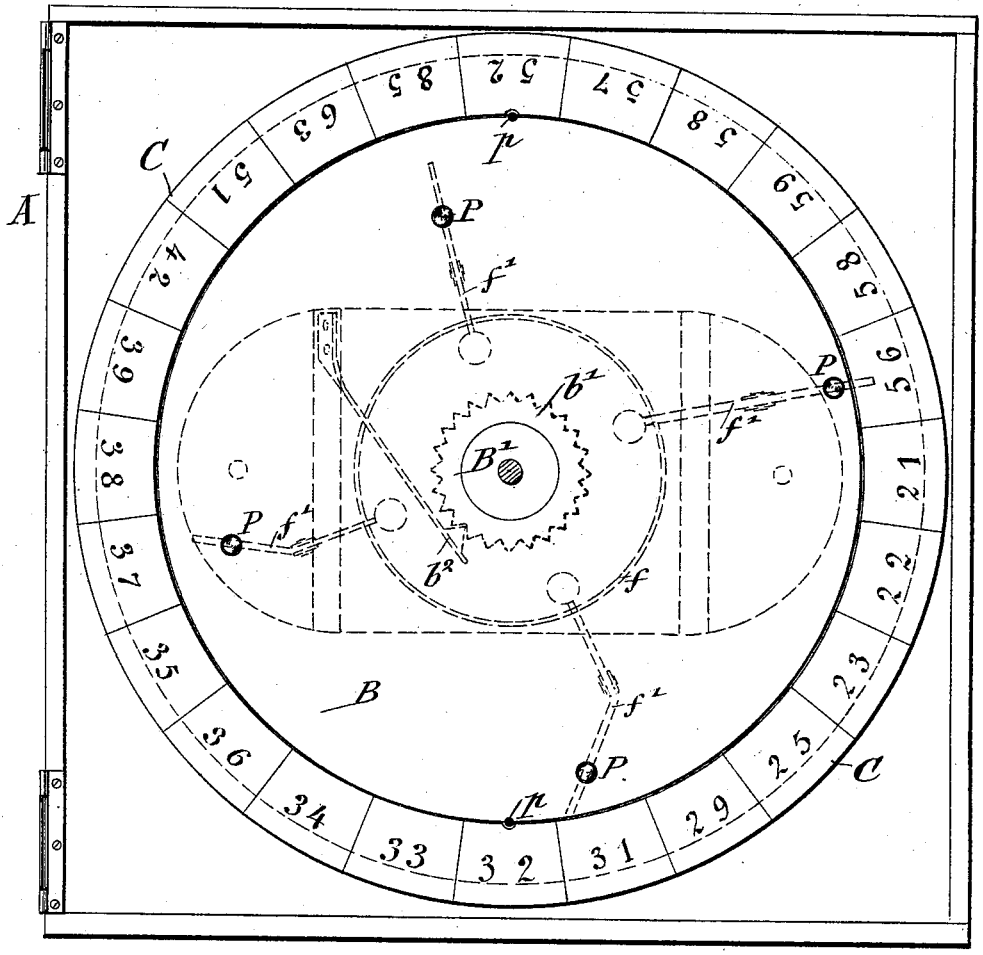
Figure 4:
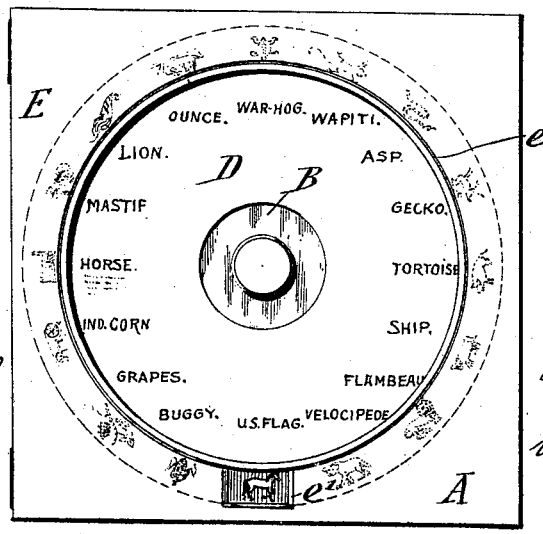

In the accompanying drawings, Figure 1 represents a top view of my improved apparatus for teaching arithmetic, objects, &c., shown as arranged for teaching arithmetic. Fig. 2 is a vertical transverse section of the same on line 2 2, Fig. 1. Fig. 3 is a top view of the apparatus with the cover removed, so as to display the index-sheet below. Fig. 4 is a plan view of the apparatus as arranged for object-teaching. Fig. 5 is a top view of a modified form of the apparatus shown in Fig. 4. Fig. 6 is a transverse section on line 6 6, Fig. 5, part being broken away. Fig. 7 is a plan view of another modification of the apparatus shown as arranged for teaching arithmetic; and Fig. 8 is a vertical transverse section on line 8 8, Fig. 7, partly broken away.

Similar letters of reference indicate corresponding parts.

Referring to the drawings, A represents the casing of my improved apparatus for teaching arithmetic, names of objects, &c. In the casing A is supported on a track A' a disk B, to which is fixed a central shaft B', provided with a knob $b$ at its upper end and supported at its lower end in a suitable step-bearing at the bottom of the casing A, to which lower end is applied a ratchet-wheel $b'$, that is engaged by a spring-pawl $b^2$. (See Figs. 2 and 3.)

The number of teeth on the ratchet-wheel corresponds with the number of figures or pictures placed on an index-sheet C, which are arranged in a circle at the circumference of the index-sheet. The index-sheet is supported on the rotary disk B, so that the disk and the index-sheet can be turned on the axis B' and placed in any suitable position, the ratchet-wheel and pawl serving for producing the required friction on the disk for retaining it in the position to which it is set.

The index-sheet C is made in circular shape and provided on its circumference with a series of numbers or objects arranged in a circle concentric with the shaft B', as shown in Figs. 3 and 4. The index-sheet is placed on the rotary disk B and attached thereto by means of round or square pins $p$ on the latter, which pins register with holes or notches in the index-sheet, so that a reliable connection is obtained between the disk and the index-sheet.

In connection with the index-sheet C is arranged a result-sheet D, which is fitted tightly, yet removably, in an opening of corresponding size in the cover E, (see Figs. 1 and 2;) but it may also be arranged so as to be rotatable in an interior groove C' in rotary disk B, (see Figs. 5 and 6,) in which latter case the result-sheet is locked, when required, against rotation relatively to the disk B by means of a spring-catch $d$, that is applied to the cover and engages in a side recess $d'$ in the result-sheet, while the index-sheet is applied in the form of a sheet of paper to the grooved top part C' of the disk.

The cover E is hinged to the casing at one side, so that it can be readily moved into open or closed position for exchanging the arithmetical index-sheet with an object-carrying index-sheet, or vice versa, according as the apparatus is to be used for teaching the different operations in arithmetic or for teaching the meaning of the different objects represented on the object-carrying index-sheet.

The cover E is provided with a large opening $e$, in which the result-sheet is tightly fitted, and a smaller opening $e'$ below the same, which openings are of sufficient size so that the numbers or objects on the index-sheet, as well as the result in figures on the result-sheet, can appear.

In Figs. 5 and 7 alongside of the opening $e'$ are arranged a stationary and a hinged panel S S', respectively, on which the questions to be asked are printed. Upon the stationary panel S the panel S' is hinged, the spindle of which is extended through the casing A and provided with a knob $S^0$, so that the hinged panel can be turned toward the left or right and be used in connection with the apparatus when objects are taught or in connection with the index and result sheet when arithmetical operations are to be explained. For this purpose the hinged panel is printed on both sides, and the stationary panel is provided with two printed portions, (see the left-hand side of Fig. 5 and the right-hand side of Fig. 7, respectively,) between which printed portions of the stationary panel the panel S' is hinged, so that when the latter panel is turned to the right, as shown in Fig. 5, it completes one question, while when turned to the left, as shown in Fig. 7, it shows reading matter connected with the arithmetical index and result sheets, whereby the same hinged panel can be used in connection with the stationary panel whether the apparatus is to be used for teaching the meaning of objects or for teaching arithmetic.

In connection with the index and result sheets may be used a proving device of any approved construction, by which it may be indicated whether the result obtained by the child using the apparatus is correct or not. The correct result is preferably audibly indicated by the sounding device shown in the drawings, which consists of a bell $f$, which is applied to the central shaft B', four strikers $f'$, that are fulcrumed to the under side of the disk B, so as to turn with the same, and four actuating-pins P, that are arranged in guide-holes of the disk B, above the outer ends of the strikers.

Before further describing the proving device it will be well to describe the result-sheet more in detail. In the result-sheets used for teaching mathematics the figures are printed in four concentric circles, preferably in different colors, so as to facilitate the reading of the result in the corresponding circle, which circles are again divided by radial lines into as many sections as there are numbers on the surrounding circle of the index-sheet, in which case the circles represent in succession, beginning with the innermost circle, addition, subtraction, multiplication, and division. The figures on the result-sheet are so arranged that when a number on the index-sheet appears in the opening $e'$ the result is read off on the result-sheet, and if correct the correctness of the arithmetical operations performed may be tested by pressure and the sounding of the proving device. Each circle of the result-sheet has a corresponding push-pin. (See the four push-pins shown in dotted lines in Fig. 1, represented as circles surrounding the figures "5," "1," "6," and "1½.")

When the index-sheet has been placed in position so as to exhibit several figures or objects through the opening $e'$ of the cover A and the correct result is read off on the result-sheet, the corresponding number on the result-sheet will be located above the operating-stud of the sounding device, so that when pressing on that point of the result-sheet with the finger the corresponding push-pin P will be depressed, the striker will be raised, and the bell sounded, indicating thereby that the result is correct. For example, in the position of the parts shown in Fig. 1 the results will be as follows:

Addition: The child is requested to add "3" and "2." It mentally calculates that "3+2=5," and to ascertain if the calculation is correct it presses on the spot of the innermost circle on the result-sheet containing the number "5," so that the push-pin belonging to said circle will be depressed and a signal given, which indicates that the child is right. If any other spot on said circle is pressed on, no response whatever will be made.

Subtraction: "2" is to be subtracted from "3." The child calculates that "3−2=1," and inasmuch as this calculation is correct the child presses on the spot of the subtraction-circle containing the number "1," and if there is only one number "1" the signal that the result obtained is correct will be given. If there be more than one number "1" in this or any other circle, the child presses on all of the corresponding numbers until a signal is given.

Multiplication: "3" is to be multiplied by "2." Supposing the child to calculate that "3×2=6," it proves that its calculation is correct by pressing upon the number "6" contained in the multiplication-circle, thus obtaining a signal from the proving device.

Division: The child is requested to divide "3" by "2." It calculates that "3÷2=1½." If the child presses on the spot containing the number "1½," the signal that the correct answer is made will be given; but if the child miscalculates and presses upon any other spot in the division-circle no response will be made.

The hammer of the striker is made large enough so as to counterbalance the pin and return the striker and pin into normal position as soon as the pressure is released. The striker then falls back to a ring R of leather, felt, or other material that deadens the sound and which is arranged around the step-bearing of the central shaft B'.

The apparatus may be made as a combined apparatus for teaching both arithmetic and objects, in which case the sounding device, as well as the stationary and movable panels on which the queries are printed, may be used. In this case several index-sheets may be provided, some arranged with numbers on their circumference and others arranged with representations of a number of objects, so that a certain scope is imparted to the apparatus.

The apparatus may be also constructed in a modified form, either for teaching arithmetic only or for teaching the meaning of objects only, in which case the sounding device and panels containing the queries may be provided, as in the form shown in Figs. 7 and 8, and the result read off directly on the result-sheet. The result-sheet in this latter example is detachable from the index-sheet, but can be so attached as to turn with the same by means of a tongue on one of them interlocking with a recess in the other, as shown in dotted lines at the top of Fig. 7.

By separating the operations separate apparatus can be supplied at a much less price than when the two systems of teaching are combined in one apparatus. The numbers on the index-sheet may be selected either consecutively or at random and the figures on the result-sheet correspond to the numbers selected. In a similar manner a great variety of objects may be represented on the index-sheet and the names of the objects on the result-sheet, so that a considerable variety of scope can be given to the apparatus.

Alongside of the opening $e'$ in the cover may be arranged a slate T, on which the child can write the results arrived at before testing them by the result-sheet, in which case a suitable pocket for the pencil has to be provided.

Having thus described my invention, I claim as new and desire to secure by Letters Patent—

1. The combination with a casing, of a rotary index-sheet, a result-sheet separate therefrom and concentric therewith, and a cover provided with an opening for exposing the matter on the result-sheet and another opening exposing the matter on the index-sheet, substantially as set forth.

2. The combination with a casing, of a rotary index-sheet, a result-sheet, a cover provided with an opening through which the result-sheet is exposed, and with another opening for exposing the figures or characters on the index-sheet, and a proving device provided with a push-pin arranged in operative connection with the result-sheet and adapted to indicate when the correct answer is obtained, substantially as set forth.

3. The combination with a casing, of a rotary index-sheet, a result-sheet, a cover provided with an opening through which the result-sheet is exposed, and with another opening for exposing the figures or characters on the index-sheet, and means for proving the result obtained, consisting of a push-pin arranged under the index-sheet, a bell, and a striker adapted to be actuated when the result-sheet is pressed against said push-pin, substantially as set forth.

4. The combination with a casing, of a rotary index-sheet supported in the same, said index-sheet being provided with numbers or characters along the circumference, a stationary result-sheet provided with figures or names arranged inside of and concentric to the numbers or characters on the index-sheet, a cover provided with a large opening for exposing the figures or characters on the result-sheet, and a smaller opening for exposing the numbers or characters on the index-sheet, a proving device and means for actuating the proving device when the correct result is obtained, substantially as set forth.

5. The combination with a casing, of an index-sheet provided with a circular series of numbers or characters, means for rotating the index-sheet on its axis, a stationary result-sheet provided with figures or names arranged inside of and concentric to the numbers on the index-sheet, a cover provided with a large opening for exposing the numbers or characters on the result-sheet and a smaller opening for the numbers or characters on the index-sheet, a sounding device, means for rotating the latter with the index-sheet and means for actuating said sounding device when the correct result is obtained, substantially as set forth.

6. In an apparatus for teaching arithmetic, objects, &c., the combination, with a casing, of a rotary index-sheet provided with a circumferential row of numbers or characters, a stationary result-sheet provided with figures or characters arranged inside of and concentric with the numbers on the index-sheet, a cover provided with a large opening for exposing the figures or names on the result-sheet and with a smaller opening for exposing the numbers or objects on the index-sheet, a stationary panel arranged alongside of the smaller opening in the cover and provided with inscriptions relative to the numbers or characters on the index-sheet, and a hinged panel provided with inscriptions corresponding with the inscriptions on the stationary panel, substantially as set forth.

In testimony that I claim the foregoing as my invention I have signed my name in presence of two subscribing witnesses.

GEORGE G. ALTMAN.

Witnesses:
PAUL GOEPEL,
GEO. W. JAEKEL.